United States Patent [19]
Buyny et al.

[11] Patent Number: 5,514,444
[45] Date of Patent: May 7, 1996

[54] FIBER REINFORCED POLYIMIDE HONEYCOMB FOR HIGH TEMPERATURE APPLICATIONS

[75] Inventors: Robert Buyny, Clayton; Ernie Bishop, Livermore; Warren Myers, Walnut Creek, all of Calif.

[73] Assignee: Hexcel Corporation, Pleasanton, Calif.

[21] Appl. No.: 261,377

[22] Filed: Jun. 17, 1994

[51] Int. Cl.⁶ ....................................................... B32B 3/12
[52] U.S. Cl. ...................... 428/116; 52/793.1; 156/197; 156/292; 428/473.5; 493/966
[58] Field of Search ................................ 428/116, 473.5; 52/793.1; 493/966; 156/197, 292

[56] References Cited

U.S. PATENT DOCUMENTS

| | | | |
|---|---|---|---|
| 3,855,160 | 12/1974 | Shiotsu et al. | 428/116 X |
| 3,959,350 | 5/1976 | Rogers | 528/185 |
| 4,336,175 | 6/1982 | Gibbs | 524/726 |
| 4,464,429 | 8/1984 | Michaud-Soret | 428/117 |
| 4,576,399 | 3/1986 | White et al. | 281/18 X |
| 4,767,656 | 8/1988 | Chee et al. | 428/116 |
| 4,864,015 | 9/1989 | Cella et al. | 428/473.5 X |
| 4,921,745 | 5/1990 | Mitsui et al. | 428/118 |
| 5,055,550 | 10/1991 | Mueller et al. | 428/473.5 X |
| 5,106,667 | 4/1992 | Ochsner et al. | 428/76 |
| 5,128,198 | 7/1992 | Dyksterhouse et al. | 428/240 |
| 5,177,180 | 1/1993 | Griffin et al. | 428/473.5 X |
| 5,314,560 | 5/1994 | Pritchet | 156/230 X |

FOREIGN PATENT DOCUMENTS

| | | | |
|---|---|---|---|
| 448248A2 | 9/1991 | European Pat. Off. | 428/473.5 |
| 1317321 | 5/1973 | United Kingdom | 428/473.5 |

*Primary Examiner*—Henry F. Epstein
*Attorney, Agent, or Firm*—Townsend and Townsend and Crew

[57] ABSTRACT

The present invention provides plastic-based fiber-reinforced honeycomb, and a process for its preparation. The fiber-reinforced honeycomb has high temperature durability yet can be fabricated and handled by simple techniques. Honeycomb structures in accordance with this invention have the strength, impact resistance and processing characteristics of thermoplastic materials and yet offer high temperature resistance and solvent resistance characteristics which permit such processing steps as the application of multiple coatings for purposes of density adjustment and enhancement of mechanical properties.

8 Claims, No Drawings

FIBER REINFORCED POLYIMIDE HONEYCOMB FOR HIGH TEMPERATURE APPLICATIONS

This invention lies in the fields of honeycomb structures and polymer processing techniques. The particular area addressed by this invention is that relating to honeycomb structures formed of fiber-reinforced polymer.

BACKGROUND OF THE INVENTION

Honeycomb has long been known for use in structural elements where a combination of lightness and strength are desirable. The use of nonmetallic materials such as ceramics and plastics offers additional advantages in terms of processing characteristics and the appearance and properties of the final product.

Thermoset plastics have been used in the manufacture of honeycomb, including honeycomb formed by bonding together corrugated ribbons of the plastic as well as honeycomb formed by bonding together corrugated ribbons of fabric impregnated with thermosetting resin followed by curing the resin in the honeycomb. Honeycomb structures formed with thermoset plastics have certain disadvantages, however, and these include limitations on the manufacturing techniques and a low resistance to damage. Because of the low damage resistance, the product is highly susceptible to damage during fabrication and lay-up and to fragmentation upon handling.

Additionally, structural honeycomb materials for high temperature applications (>500° F.) have not been successfully commercialized to date. This is due in part to difficulties in obtaining concurrently, processability and high temperature durability, in a polyimide matrix.

Polyimide film honeycomb materials have been described (see U.S. Pat. No. 4,921,745, the disclosure of which is incorporated herein by reference). However, these materials are not suitable for structural use.

What is needed in the an are new fiber-reinforced honeycomb structures which can be used in high temperature applications, including aerospace structures, turbine engine structures and heat exchangers.

SUMMARY OF THE INVENTION

The present invention provides plastic-based honeycomb, and a process for its preparation, which does not suffer the disadvantages noted above. The fiber-reinforced honeycomb of the present invention has high temperature durability yet can be fabricated and handled by simple techniques. Honeycomb structures in accordance with this invention have the strength, impact resistance and processing characteristics of thermoplastic materials and yet offer high temperature resistance and solvent resistance characteristics which permit such processing steps as the application of multiple coatings for purposes of density adjustment and enhancement of mechanical properties.

Central to the invention is the use of two different polymer solutions, one for impregnating a fiber web and the other for flow coating or dipping of an initially formed honeycomb core structure. The solutions each contain a linear prepolymer which is soluble in a preselected solvent, and which, without crosslinking, is heat curable to a linear polymer which is insoluble in that solvent, the cured polymer having a glass transition temperature (Tg) equal to or greater than about 200° C. A fiber web is initially impregnated with the prepolymer, using any of a variety of techniques, to bond the fibers of the web into a stable coherent structure. A web structure which is expandable into a honeycomb panel is then formed by arranging ribbons or sheets of the impregnated web into a stack, with adjacent ribbons or sheets bonded together along transverse node lines. The bonded structure is then expanded into an open-cell honeycomb structure, with the optional application of heat to facilitate the expansion. The expanded structure is then heated further to complete the curing process and stabilize the structure. The cured polymer has a thermoplastic character which permits expansion and handling without damage to the polymer. The insolubility of the cured polymer permits the polymer to be applied in stages, with repeated applications subsequent to the expansion and initial cure if desired. In this manner, high polymer loadings can be achieved, and layers of additional polymer or coating materials can be applied to form a honeycomb structure with a specified combination of properties. In preferred embodiments, the initial impregnation is done by dipping the fiber web in a solution of the prepolymer.

Other advantages, features and embodiments of the invention will be apparent from the description which follows.

DETAILED DESCRIPTION OF THE INVENTION

The present invention is applicable to fiber-reinforced honeycomb structures in general as well as to the various known methods of structural honeycomb manufacture. The invention is of particular interest however as applied to honeycomb formed from nested stacks of ribbons or sheets which are bonded together at node lines periodically spaced along each layer.

The present invention provides a process for forming fiber reinforced structural honeycomb having high temperature durability, by:

(i) impregnating a fiber web with a thermally stable high Tg polymer solution, the polymers having a degree of polymerization greater than about 50, to obtain a blinded web sheet;

(ii) preparing a bonded structure of blinded web sheets wherein adjoining blinded web sheets are combined to each other with an adhesive arranged along node lines such that the node lines on one side of any blinded web sheet are located at positions shifted from the node lines on the opposite side of said blinded web sheet;

(iii) expanding the bonded structure in the direction vertical to the plane of the blinded web sheets to form a honeycomb core structure;

(iv) dipping the honeycomb core structure in a second thermally stable high Tg polymer solution, the second polymers having a degree of polymerization of from about 20 to about 80 with the proviso that the degree of polymerization of the polymers of step (i) is greater than the degree of polymerization of the polymers of step (iv), and drying; and (v) repeating step (iv) for a number of times sufficient to form a fiber reinforced structural honeycomb having a polymer weight percent of from about 30% to about 70%.

The fiber web or reinforcement may be any material capable of being impregnated or coated by a polymer. Both woven and nonwoven fibers may be used, including both natural and synthetic materials. Fibers which are particularly useful in the present invention include, fibers of carbon, glass, boron, silicon carbide and aromatic polyamide (i.e. Kevlar®). Reinforcements made from carbon fibers, glass fibers or aromatic polyamide fibers are particularly preferred. The porosity and weight of the fiber web may also vary widely. In most cases, fiber webs having a weight ranging from about 0.5 to about 10 ounces per square yard (about 15 to 300 grams per square meter), preferably from about 0.5 to about 2.0 ounces per square yard (17 to 68 grams per square meter) will provide the best results. As for the honeycomb itself, the dimensions are not critical and the invention applies to a wide range of honeycomb configurations and sizes. The most typical cells are hexagonal in shape, with a width of about one-quarter inch (0.6 cm) or less.

The thermally stable, high Tg polymer solution serving as the fiber impregnant is a linear polymer or prepolymer which is susceptible to curing to form a polymer which is substantially linear with a glass transition temperature of about 200° C. or higher. Additionally, the polymers in solution will have a degree of polymerization greater than about 50. Preferred prepolymers are those which upon curing form a polymer with a glass transition temperature within the range of about 200° C. to about 400° C., more preferably from about 300° C. to about 400° C. In its uncured form the prepolymer, or resin, is soluble in a solvent, whereas once cured the polymer is insoluble in that solvent. In preferred embodiments, the degree of polymerization of the prepolymer solution will be controlled to obtain a solution which is dilute, but still viscous. With appropriate viscosity, the prepolymer solution will provide the film forming qualities necessary to obtain a "blinded" web and thereby prevent adhesive bleed-through. A number of high temperature polymers are suitable for use in the present invention including polyimides, polyetherimides, polyamideimides, polybenzimidazoles, polytriazines, polyphenylquinoxalines and polyphthalocyanines. Suitable prepolymers are those which provide a high, controlled molecular weight polymer.

Preferred prepolymers are those which are precursors to (i.e., upon curing form) polyimides and which are the intercondensation product of dianhydrides and aromatic diamines.

A number of dianhydrides are useful for the preparation of the polymers and include, for example, 2,2-bis(3,4-dicarboxyphenyl)-hexafluoropropane dianhydride (6FDA), 4,4'-oxydiphthalic anhydride (ODPA) and its related isomers (3,4'- and 3,3'-), and biphenyl dianhydride (BPDA). A preferred dianhydride is 6FDA.

The aromatic diamines which are useful for the preparation of the polymers include ortho-, meta- and para-phenylene diamine (oPDA, mPDA and pPDA, respectively), as well as those aromatic diamines having multiple benzene rings (either linked together by a bridging group or atom, or fused). Examples of aromatic diamines having multiple benzene rings include 4,4'-diaminodiphenyl ether, 3,4'-diaminodiphenyl ether, 3,3'-diaminodiphenyl ether, 4,4'-diaminodiphenyl sulfide, 4,4'-diaminodiphenyl sulfone, 1,3-bis(4-aminophenoxy)benzene, 1,4-bis(4-aminophenoxy)benzene and 1,5-diaminonaphthalene. A preferred aromatic diamine is pPDA.

The terms "thermal curing," "thermal conversion" and related terms used herein are intended to denote a chemical reaction, such as condensation, chain lengthening, or other type of conversion which alters the molecular structure of the polymer or prepolymer, and which occurs spontaneously upon exposure to elevated temperature.

The choice of solvent for the polymer solution is not critical and may vary widely, provided that it dissolves the prepolymer prior to its conversion to the insoluble state. Polar aprotic organic solvents are preferred, and examples are dimethylformamide (DMF), dimethylacetamide, dimethyl sulfoxide (DMSO) and N-methylpyrrolidone (NMP). The properties of the solution may be modified by the use of a diluent, which may be any liquid which is miscible with the solvent, does not cause premature precipitation of the unconverted prepolymer, and yet does not dissolve the converted polymer. Examples of diluents compatible with the solvents listed above are aromatic hydrocarbons, ethyl acetate, acetone, cyclohexanone, acetamide and acetanilide. The diluent may serve as an aid in removing the solvent, as for example by evaporation, or as an additive for adjusting the viscosity of the solution, or both.

The concentration of prepolymer in the solution may also vary, and will be chosen in accordance with the desired viscosity of the solution and other processing characteristics. In step (i) of the present invention, best results will be obtained using solutions having a dissolved solids content (i.e., the prepolymer) of less than about 15 %, preferably about 5–10% by weight. One solution which has been found to be particularly effective is a solution of 6FDA and pPDA in N-methylpyrrolidone, with a solids content of about 6% by weight.

The fiber web of step (i) may be impregnated or coated with the thermally stable high Tg polymer solution by any conventional means, including by spraying, dipping, soaking, padding, rolling and the like. Pressure may be applied to consolidate the fibers and the polymer solution. Heat is then applied to cure the polymer solution and complete the formation of the blinded web. When the polymer solution is prepared from an aromatic diamine and a dianhydride, the application of heat results in a conversion of polyamic acid to polyimide, with a concomitant loss of water. Typically, the curing process will use temperatures of from about 150° C. to about 400° C., preferably about 180° C. to about 230° C., for a period of up to 24 hours.

In steps (ii) and (iii), the blinded web sheets are formed into a bonded structure and expanded into a honeycomb core structure. Fabrication of the honeycomb may be done in accordance with known procedures. The term "honeycomb" is used herein to denote any open-cell grid structure, and particularly such open-cell structures which are formed from bonded sheet stacks which are expanded or drawn apart. Examples of such stacks and the honeycomb panels which they form upon expansion are found in Steele, R. C., et al., U.S. Pat. No. 2,674,295 (Apr. 6, 1954); Holland, K. M., U.S. Pat. No. 3,006,798 (Oct. 31, 1961); Anderson, D. C., et al., U.S. Pat. No. 3,466,957 (Sep. 16, 1969); Noble, R. G., et al., U.S. Pat. No. 3,598,676 (Aug. 10, 1971); and Taylor, R. S., U.S. Pat. No. 3,819,439 (Jun. 25, 1974). The disclosures of these patents are incorporated herein by reference.

In a preferred embodiment, the bonded structure of step (ii) has individual sheets attached to each other by means of an adhesive which is arranged along node lines. The node lines on one side of any blinded web sheet are located at positions shifted from the node lines on the opposite side of the sheet. The nature of the adhesive is not critical, but it should be a heat-resistant adhesive which will soften below the Tg of the web matrix, and subsequently thermally cure to achieve a Tg and oxidative stability similar to the web matrix. Examples of suitable adhesives include heat-resistant epoxy adhesives, heat-resistant polyimide adhesives and heat-resistant polybenzimidazole adhesives. Preferred adhesives include Skybond 700 (Monsanto, St. Louis, Mo., USA), AI-10 (Amoco Chemicals Corporation, Chicago, Ill., USA), PMR 15 (according to U.S. Pat. No. 3,745,149, incorporated herein by reference), AFR 700B (according to U.S. Pat. No. 5,132,395, incorporated herein by reference), polyimide sulfone adhesives, and mixtures of the above. The bonded structure thus formed can then be expanded in the direction vertical to the plane of the blinded web sheet to form a honeycomb core structure. The bonded structure which is expanded into open-cell honeycomb structures may be of various thicknesses, lengths and widths. As addressed by the present invention, the bonded structure may be formed from components which range from long, narrow strips or ribbons, to relatively wide sheets. In practice, ribbon stacks are generally formed from sheet stacks by cutting with a band saw or similar equipment. Other methods of preparation are possible, however, and the present invention is not contemplated to be limited to any particular method or any particular configuration of the stack. For purposes of convenience, ribbons and sheets will be referred to herein generically as "layers." Typically, this expansion is carried out with the application of heat which further acts to cure the adhesive.

After cooling, the honeycomb core structure can be dipped repeatedly in a second thermally stable high Tg polymer solution to provide a honeycomb material having a density sufficient to withstand the high temperature applications required in aerospace structures, turbine engine structures and heat exchangers. To achieve this, the solution solids content should be within a critical concentration range, typically about 15–30%. This can be accomplished by minimizing polymer molecular weight without sacrificing mechanical properties. Thus, the polymers of the second solution will have a degree of polymerization which is greater than the solution of step (i) and which is in the range of from about 20 to about 80. The particular polymers used in the second solution can be prepared from the same or different monomers than were used in the first solution. In a preferred embodiment, the second polymer solution is a solution of polyamic acids in an aprotic solvent. The polyamic acids are formed by polymerizing an aromatic dianhydride and an aromatic diamine, more preferably 6FDA and pPDA, in a ratio of about 0.90 to about 0.99, more preferably a ratio of about 0.93 to about 0.97. The resulting solution will preferably have greater than about 15% resin solids. In a particularly preferred embodiment, the polymers in the second solution are endcapped with either an aromatic anhydride or an aromatic amine.

Between applications of the second polymer solution, the honeycomb core structure is dried. The manner of drying is not critical and can be carried out by any means known to those of skill in the art. In a preferred embodiment, the honeycomb core structure is placed in a circulating air oven to remove excess solvent.

In another aspect, the present invention provides a fiber reinforced structural honeycomb having high temperature durability and further having a polymer weight percent of from about 30% to about 70%. The structural honeycomb comprises a honeycomb core structure coated with a first thermally stable high Tg polymer. The honeycomb core structure is formed by impregnating a fiber web with a second thermally stable high Tg polymer solution to provide blinded web sheets and the blinded web sheets are formed into a bonded structure by combining the sheets with an adhesive arranged along node lines. The bonded structure is formed into a honeycomb core structure by expanding in the direction vertical to the plane of the blinded web sheets. The first thermally stable high Tg polymers have a degree of polymerization of from about 20 to about 80 and the second thermally stable high Tg polymers have a degree of polymerization of greater than about 50, with the proviso that the degree of polymerization of the second polymer is greater than the degree of polymerization of the first polymer.

In preferred embodiments, the first and second polymers are independently polyimides, polyetherimides, polyamideimides, polybenzimidazoles, polytriazines, polyphenylquinoxalines or polyphthalocyanines, more preferably polyimides. In a particularly preferred embodiment, the first polymer formed by polymerizing 6FDA and pPDA in a ratio of about 0.93 to about 0.97 in NMP and is endcapped with either an aromatic anhydride or an aromatic amine. The second polymer is preferably formed by polymerizing equimolar amounts of 6FDA and pPDA in NMP.

The present invention also provides honeycomb structural materials prepared by any of the methods of the present invention. Additionally, the preferred embodiments are those recited for the methods described above.

The following examples are provided by way of illustration and not by way of limitation.

EXAMPLE 1

This example illustrates the preparation of a fiberglass reinforced polyimide honeycomb for 700° F. service.

A prepolymer solution is formed by polymerizing equimolar amounts of 6FDA and pPDA in NMP to obtain a high molecular weight (DP>100) polyamic acid solution. See, for example, Rogers, U.S. Pat. No. 3,959,350, the disclosure of which is incorporated herein by reference. The solution is adjusted to 6% prepolymer solids with NMP and used to impregnate a roll of glass fiber fabric (108 style, Clark-Schwebel, White Plains, N.Y., USA). The fabric is typically 2 to 4 mils in thickness, and is prepolymer-impregnated by saturating the fabric with a solution of the prepolymer in its soluble form. The saturated fabric is then passed through an oven at a temperature of about 400° F. (204° C.) for 5 to 8 minutes, which results in the N-methylpyrrolidone being flashed off to produce a continuous, nonporous polymer film on the surface of the fiber bundles. The polymer film is dried and partially cured to a tack-free state, having a prepolymer (resin) content of about 12%. The roll is then cut into sheets. In one embodiment the roll is cut into sheets about 36 inches (91 cm) in width, on a 45° bias, i.e., in a direction such that the fibers are aligned at an angle of approximately 45° with respect to the lateral edges of the sheets. The longitudinal edges of the sheets are then overlapped, adhesively bonded together and heat sealed. This is followed by rolling the sheets into rolls and heat soaking the rolls at about 350° F. (177° C.) for at least one hour for final curing of the adhesive.

Once the rolls are cured, they are unrolled and node lines, typically of a high-temperature node-bond adhesive which is compatible with the polymer and the fabric, are applied. A preferred adhesive is a polyimide-based adhesive which is typically a mixture of polyimides. These node lines are printed on the sheets at regular intervals using a standard gravure technique. The rolls are then cut into rectangular sheets which are stacked to a thickness of about 1 to 2 inches (2.5 to 5.0 cm). The stacks are then placed in a press where they are heated to a temperature of about 350° F. (177° C.) under a pressure of about 25 to 200psi (1.76 to 14.1 kg/cm$^2$) to cure the node adhesive, thereby bonding the sheets together at the node lines. The result is a stack ready for expansion into a honeycomb structure.

The stack may be expanded to an open-cell panel of the desired dimensions, and held in the expanded state by a jig or frame. Stacks made from webs with a low polymer content can be expanded at room temperature. In most applications, however, particularly those involving anything other than very low polymer loadings, expansion is best done with the aid of heat, which is conveniently applied by the use of steam and/or hot water.

After expanding and framing, the honeycomb block may then be heat soaked, i.e., placed in an oven at an elevated temperature for further cure of the polymer and stabilization of the structure. The optimum temperature will depend on the particular polymer being used, but will generally be at least about 400° F. (204° C.), preferably from about 400° F. to about 600° F. (204–316° C.), more preferably from about 500° F. to about 600° F. (260–316° C.). The heating time will generally be at least about thirty minutes, and preferably from about thirty to about ninety minutes. For the polymer referred to above, a heat soak at 550° F. (288° C.) for one hour has been used effectively.

Thus expanded, the honeycomb core structure is then dipped in a prepolymer solution prepared by polymerizing 6FDA and pPDA in a ratio of 0.95 in NMP which is then end capped with phthalic anhydride. The medium molecular weight (DP~39) polyamic acid solution having a concentration of 19% prepolymer solids can be used to add further prepolymer to the structure. The solution described is flow coated over the honeycomb core structure so that all surfaces are coated uniformly. After rotating the block of core, excess solution is allowed to drain and the block is placed in a circulating air oven to remove solvent. The dipping procedure may be repeated as often as desired to achieve a final honeycomb of the desired density and other characteristics. By optimizing the polyimide molecular weight, the number of dipping cycles will typically be less than five to obtain a two-fold increase in block density.

When successive applications of prepolymer are made, the prepolymers may be the same or different. When different prepolymers are combined in either of these two ways in a single honeycomb structure, the prepolymers must be compatible with each other. Two prepolymers are considered compatible when they fuse together as one cures over a cured layer of the other, thereby forming layers which are not easily separated by physical or mechanical means. The combining of two or more prepolymers in this fashion permits the formation of hybrid structures and the achievement of useful as well as synergistic properties.

EXAMPLE 2

This example illustrates the properties of a high temperature fiber reinforced honeycomb prepared according to Example 1 (HRH-427). The procedures to evaluate specific properties were as follows: Compression test according to ASTM C 365; Web Tensile Strength according to ASTM D 3518.

TABLE 1

Comparison of Fiberglass/Polyimide Honeycomb Properties
Core Density 4.5 Pounds/Cubic Foot Properties
at Room Temperature Following the Indicated Exposure

| Property | Exposure (hours at °F.) | HRH-327 | HRH-427 |
|---|---|---|---|
| Compression Strength (pounds/inch²) | 0 at RT | 513 | 507 |
|  | 200 at 550° F. | 415 | — |
|  | 200 at 700° F. | None | 468 |
| Web Tensile Strength (pounds/inch², in thousands) | 0 at RT | 35.6 | 33.2 |
|  | 200 at 550° F. | 18.0 | — |
|  | 200 at 700° F. | 1.4 | 25.3 |

HRH-327 is a commercially available honeycomb material which is used for some higher temperature applications. HRH-427 is a honeycomb prepared according to the method in Example 1.

The foregoing is offered primarily for purposes of illustration. It will be readily apparent to those skilled in the art that modifications and variations may be made in the materials, proportions, conditions and procedures used without departing from the spirit and scope of the invention.

What is claimed is:

1. A method for forming fiber reinforced structural honeycomb having high temperature durability, comprising:

(i) impregnating a fiber web with a first thermally stable high Tg polymer solution, said first polymers having a degree of polymerization greater than about 50, to obtain a blinded web sheet;

(ii) preparing a bonded structure of blinded web sheets wherein adjoining blinded web sheets are combined to each other with an adhesive arranged along node lines and the node lines on one side of any blinded web sheet are located at positions shifted from the node lines on the opposite side of said blinded web sheet;

(iii) expanding said bonded structure in the direction vertical to the plane of the blinded web sheets to form a honeycomb core structure;

(iv) dipping said honeycomb core structure in a second thermally stable high Tg polymer solution, said second polymers having a degree of polymerization of from about 20 to about 80 with the proviso that the degree of polymerization of said first polymers is greater than the degree of polymerization of said second polymers, and drying; and (v) repeating step (iv) for a number of times sufficient to form a fiber reinforced structural honeycomb having a polymer weight percent of from about 30% to about 70%.

2. A method in accordance with claim 1 wherein said first polymers are selected from the group consisting of polyimides, polyetherimides, polyamideimides, polybenzimidazoles, polytriazines, polyphenylquinoxalines and polyphthalocyanines.

3. A method in accordance with claim 1 wherein said first polymer solution is a solution of polyamic acids having less than about 15% resin solids, said polyamic acids being formed by the polymerization of equimolar amounts of an aromatic dianhydride and an aromatic diamine in an aprotic solvent.

4. A method in accordance with claim 1 wherein said first polymer solution is a solution of polyamic acids having less than about 15% resin solids, said polyamic acids being formed by the polymerization of equimolar amounts of 6FDA and pPDA in an aprotic solvent.

5. A method in accordance with claim 1 wherein said second polymer solution is a solution of polyamic acids having greater than about 15% resin solids, said polyamic acids being formed by polymerizing an aromatic dianhydride and an aromatic diamine in a ratio of about 0.90 to about 0.99 in an aprotic solvent.

6. A method in accordance with claim 1 wherein said second polymer solution is a solution of polyamic acids having greater than about 15% resin solids, said polyamic acids being formed by polymerizing 6FDA and pPDA in a ratio of about 0.90 to about 0.99 in an aprotic solvent.

7. A method in accordance with claim 1 wherein said first polymer solution is a solution of first polyamic acids having about 6% resin solids, said first polyamic acids being formed by the polymerization of equimolar amounts of 6FDA and pPDA in NMP and said second polymer solution is a solution of second polyamic acids having greater than about 15% resin solids, said second polyamic acids being formed by polymerizing 6FDA and pPDA in a ratio of about 0.93 to about 0.97 in NMP and being end capped with a compound selected from the group consisting of aromatic anhydrides and aromatic amines.

8. A fiber reinforced structural honeycomb having high temperature durability and further having a polymer weight percent of from about 30% to about 70%, comprising a honeycomb core structure coated with a first thermally stable high Tg polymer, said honeycomb core structure being formed by impregnating a fiber web with a second thermally stable high Tg polymer solution to provide blinded web sheets, said blinded web sheets being formed into a bonded structure by combining said sheets with an adhesive arranged along node lines and said bonded structure being formed into said honeycomb core structure by expanding in the direction vertical to the plane of said blinded web sheets, wherein said first thermally stable high Tg polymers have a degree of polymerization of from about 20 to about 80 and said second thermally stable high Tg polymers have a degree of polymerization of greater than about 50, with the proviso that the degree of polymerization of said second polymer is greater than the degree of polymerization of said first polymer.

* * * * *